United States Patent [19]

Nagao

[11] Patent Number: 5,181,261
[45] Date of Patent: Jan. 19, 1993

[54] AN IMAGE PROCESSING APPARATUS FOR DETECTING THE BOUNDARY OF AN OBJECT DISPLAYED IN DIGITAL IMAGE

[75] Inventor: Takashi Nagao, Kanagawa, Japan

[73] Assignee: Fuji Xerox Co., Ltd., Tokyo, Japan

[21] Appl. No.: 628,954

[22] Filed: Dec. 18, 1990

[30] Foreign Application Priority Data

Dec. 20, 1989 [JP] Japan .................................. 1-330235

[51] Int. Cl.[5] .............................................. G06K 9/20
[52] U.S. Cl. ........................................ 382/48; 382/22; 382/25; 358/452; 358/453
[58] Field of Search ................. 382/22, 25, 28, 30, 382/48, 57; 364/518, 521; 358/452, 453

[56] References Cited

U.S. PATENT DOCUMENTS 4,783,829 11/1988 Miyakawa et al. .................... 382/30
4,965,678 10/1990 Yamada .................................. 382/48

Primary Examiner—Jose Couso
Attorney, Agent, or Firm—Finnegan, Henderson, Farabow, Garrett and Dunner

[57] ABSTRACT

A method and apparatus for processing an image composed of pixels having actual values is used in image processing applications for images picturing an object having a boundary. A group of pixels making up the image is designated, and the designated group of pixels includes the pixels which form the image of the object. The pixels in the designated group of pixels are labeled with label values, and one of the labeled pixels in the designated group is randomly marked. The label value of the marked pixel is altered, and the altered label value is dependent upon the acutal value and the label value of the marked pixel and the actual value and the label value of at least one other pixel.

18 Claims, 15 Drawing Sheets

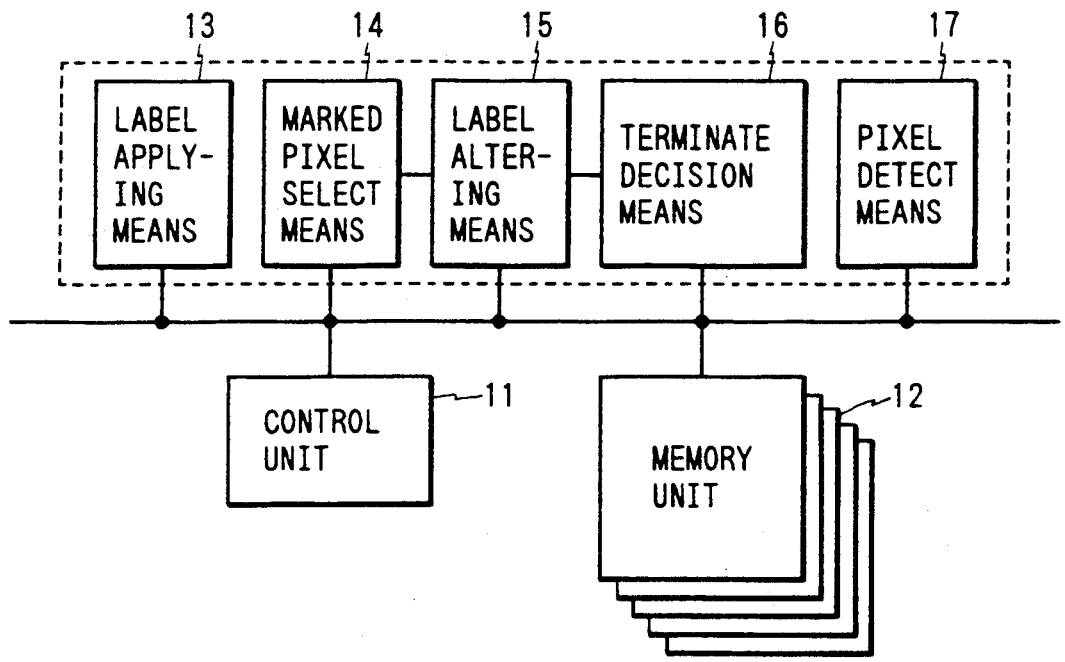
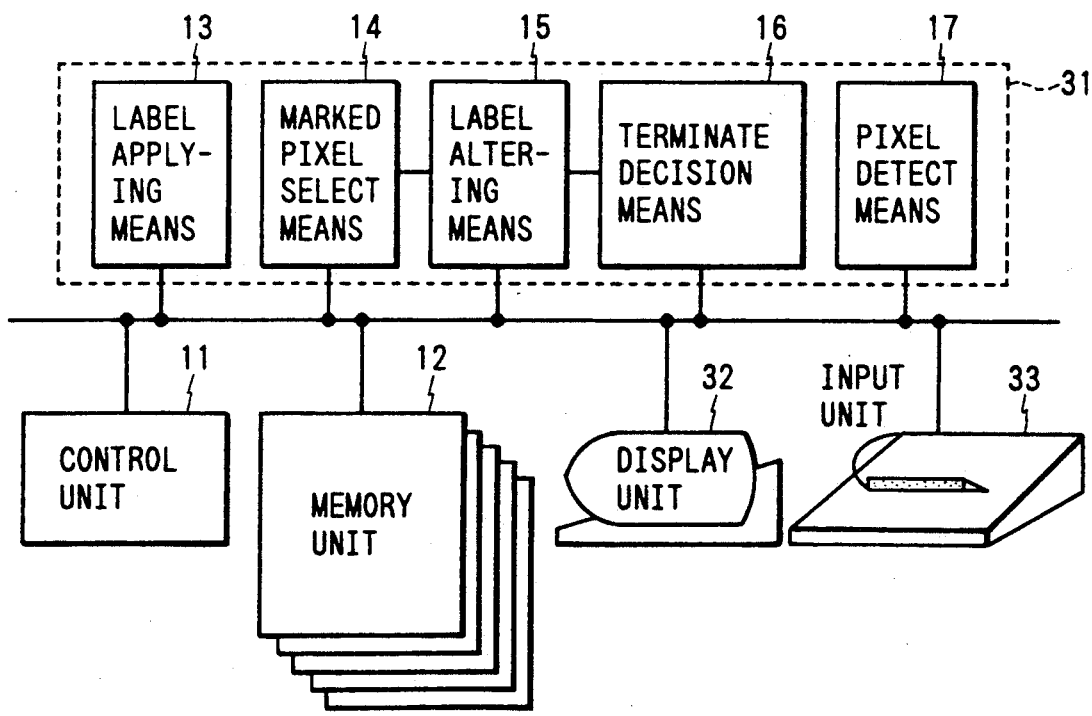

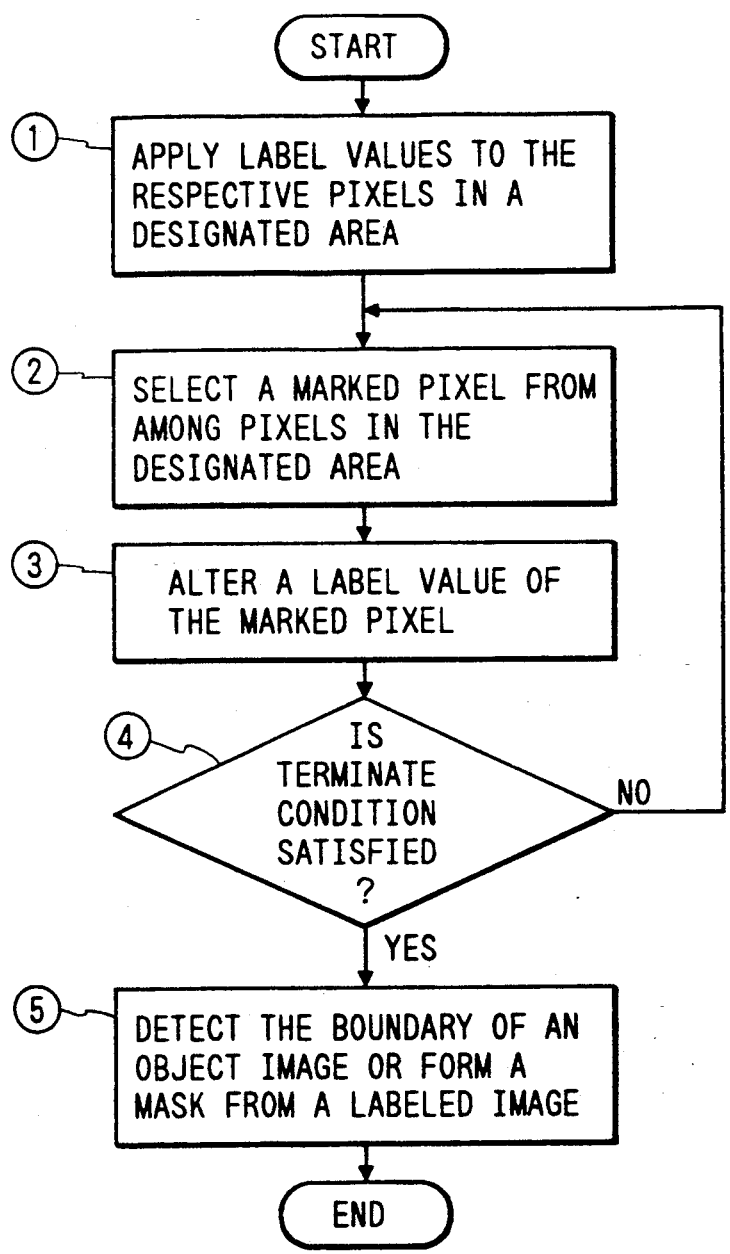

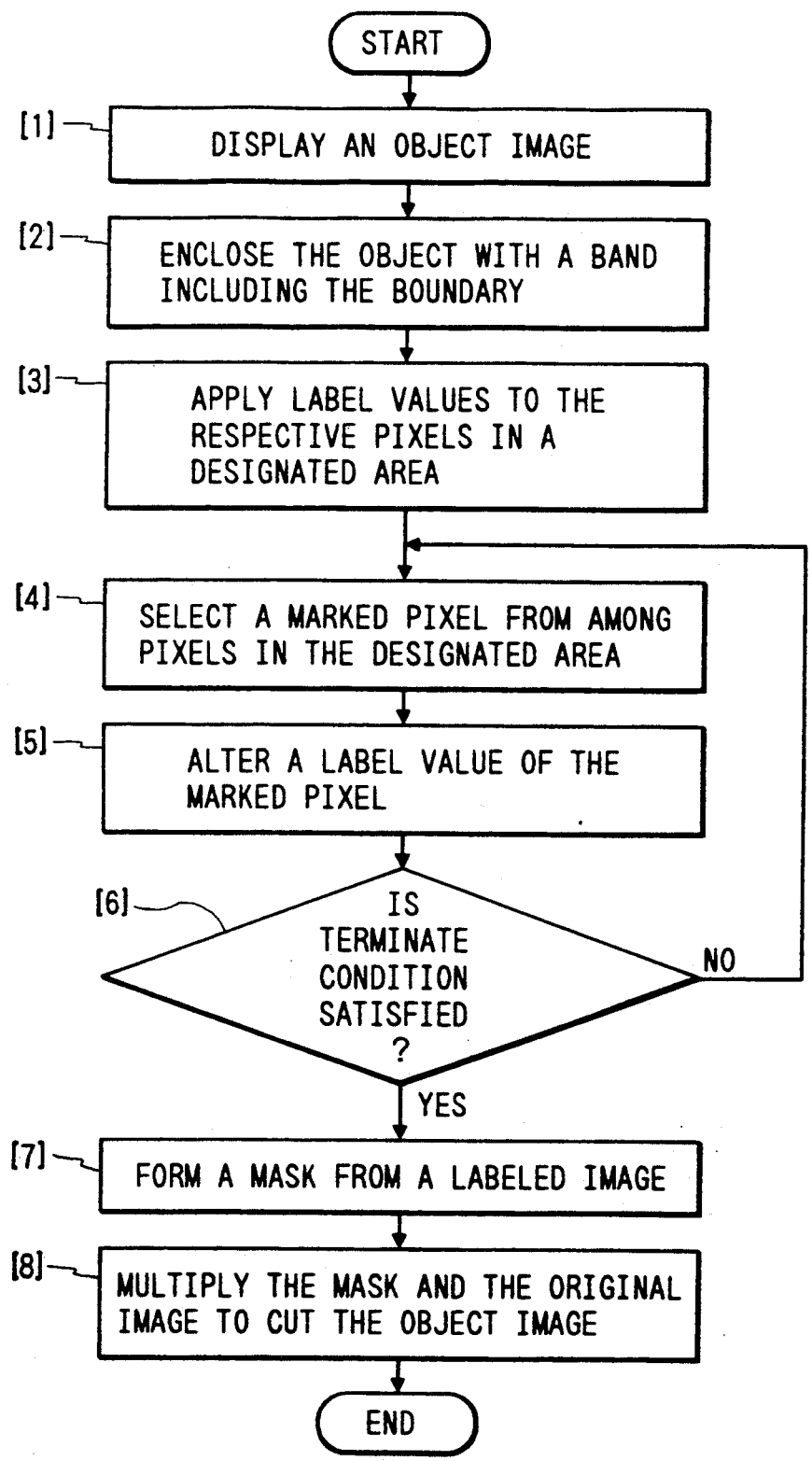

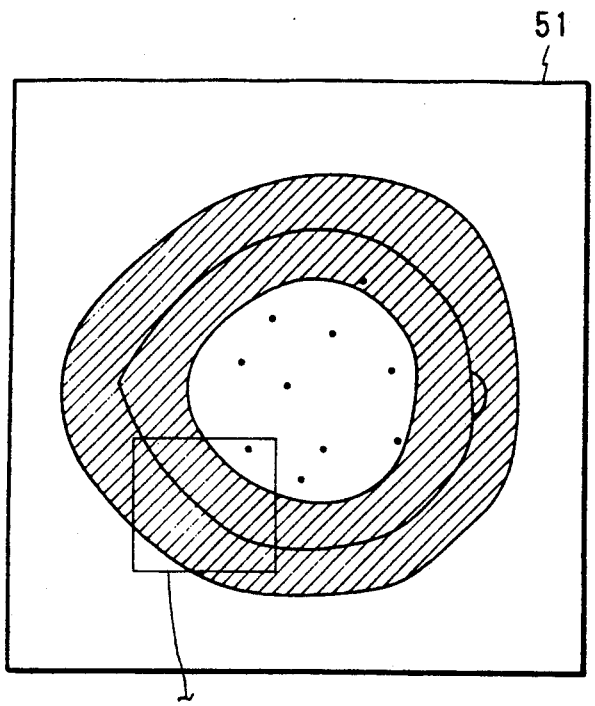

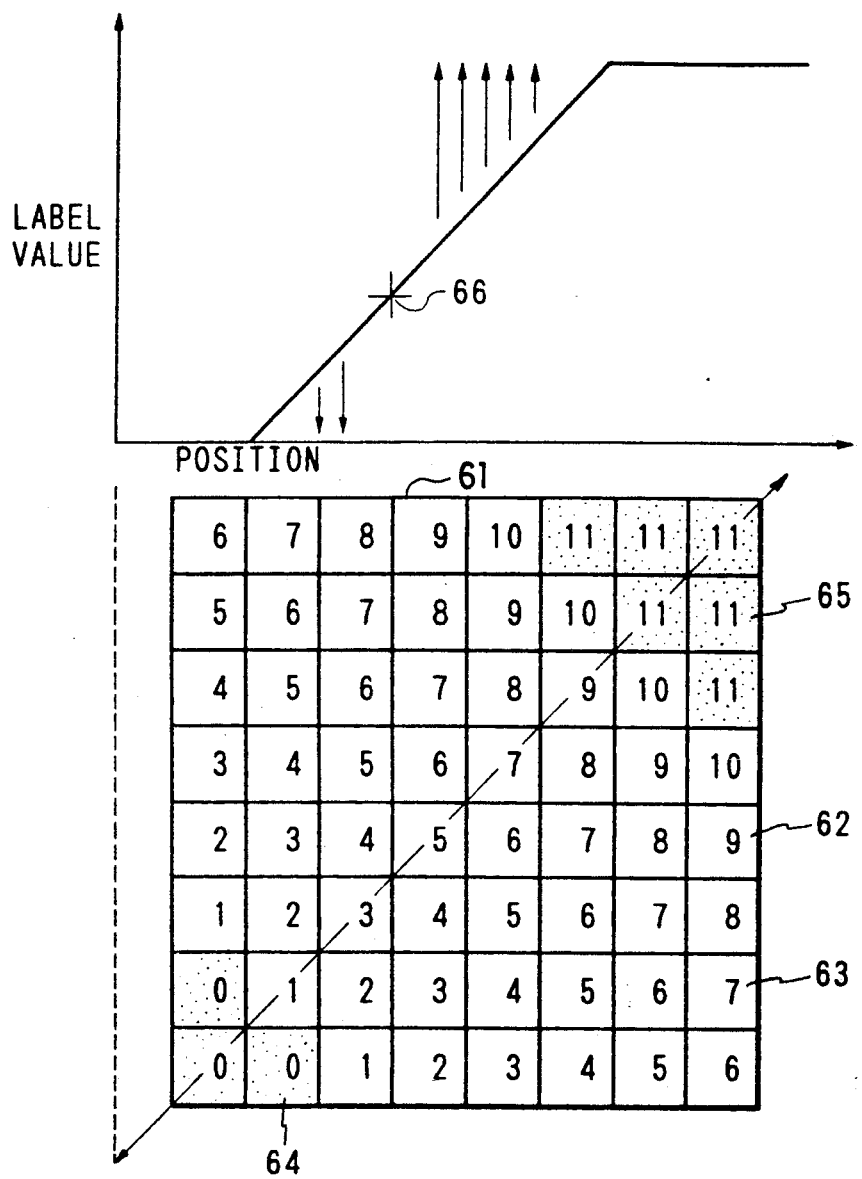

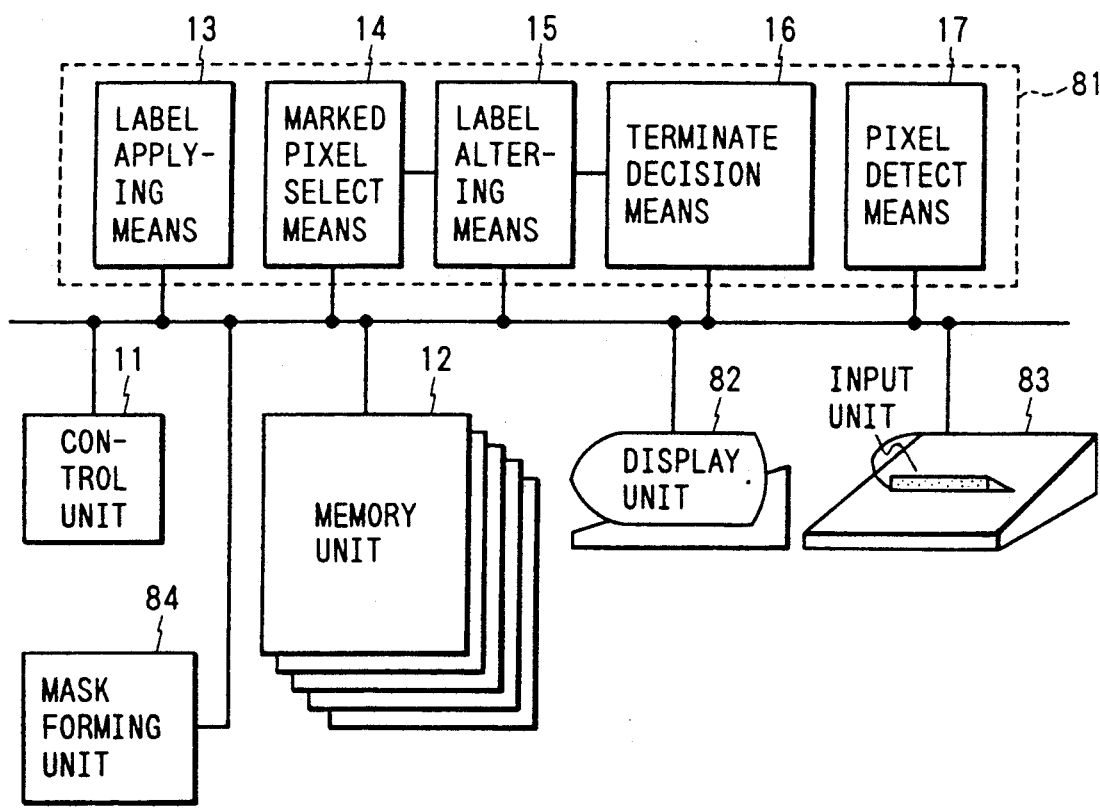

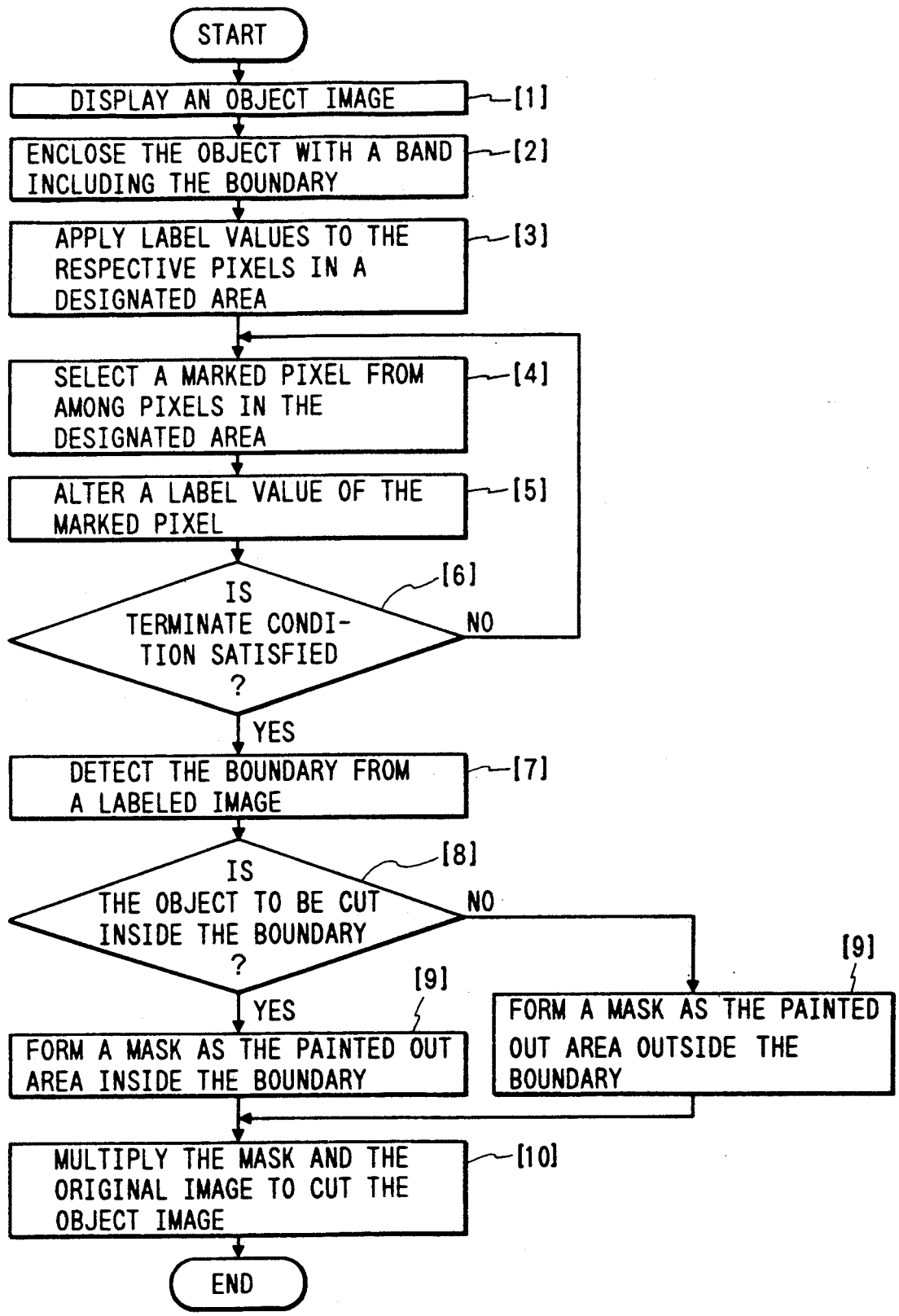

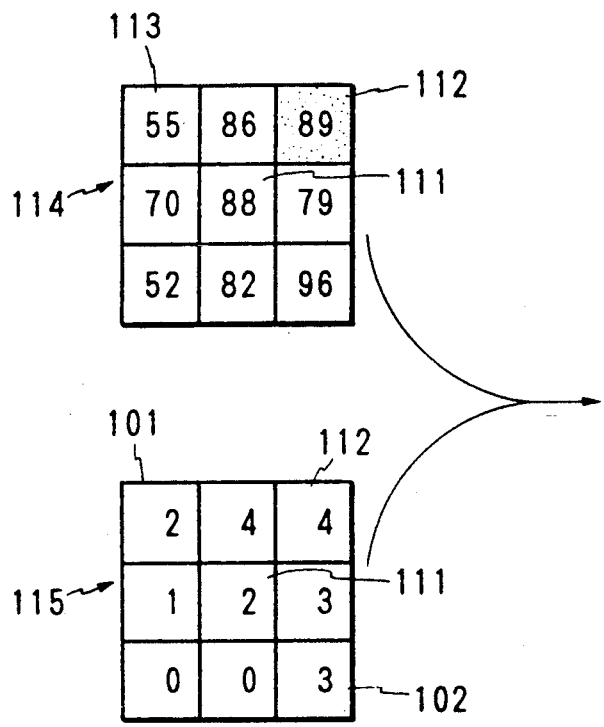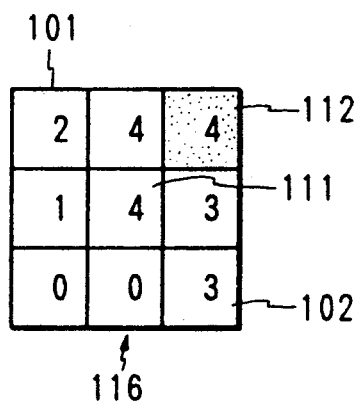
FIG. 11(a)
FIG. 11(b)
FIG. 11(c)

AN IMAGE PROCESSING APPARATUS FOR DETECTING THE BOUNDARY OF AN OBJECT DISPLAYED IN DIGITAL IMAGE

BACKGROUND OF THE INVENTION

1. Field of the Invention

The present invention relates to an image processor for detecting the boundary of an object displayed in a digital image, such as a photograph or a video image.

The image processing apparatus obtains a contour image of the object based upon the boundary information of the detected object. Further, a mask image of the object may be formed, and the object may be edited for "cut & paint" modification on the basis of the mask image. The color of the object may also be altered.

2. Description of the Related Art

A part of a digital image, such as an object displayed in a photograph or a video image may be cut out of the total image for use in image edits.

In one known technique, an enlarged object is displayed, and the object is traced using straight lines and curves to cut the portion of the image containing the object. When the object to be cut is large or complicated, however, this technique requires intricate processing to cut the portion of the image containing the object.

There are two methods for cutting large or complicated objects. First, an image area having one color may be designated, as shown in Japanese Patent Application Unexamined Publication No. 62-198968. Second, differential processing may be used to cut the edges, as shown in Japanese Patent Application Unexamined Publication No. 62-219179.

The first method can only be used for special objects with substantially uniform colors, and will not work on ordinary objects in which light reflection and color variation due to texture are present.

In the second method, an extracted edge is frequently expressed by a closed loop. Further, since noise and texture are picked up with the edge, intricate post processing is required.

SUMMARY OF THE INVENTION

Accordingly, an object of the present invention is to provide an image processing apparatus which can detect, in a simple and easy manner, the boundary and mask image of an image of an appropriately designated object in an ordinary image containing light reflection, texture, and noise.

Additional objects and advantages of the invention will be set forth in part in the description which follows and in part will be obvious from the description, or may be learned by practice of the invention. The objects and advantages of the invention ma be realized and attained by means of the instrumentalities and combinations particularly pointed out in the appended claims.

To achieve the above objects of the invention a method for processing an image composed of pixels having actual values, the image picturing an object having a boundary, is used. The method comprising the steps of: designating a group of pixels, the designated group of pixels including the pixels which form the image of the object; labeling the pixels in the designated group of pixels with label values; marking one of the pixels in the designated group; and altering the label value of the marked pixel, the altered label value being dependent upon the actual value and the label value of the marked pixel and the actual value and the label value of at least one other pixel.

BRIEF DESCRIPTION OF THE DRAWINGS

The accompanying drawings, which are incorporated in and constitute a part of this specification, illustrate embodiments of the invention and, together with the description, serve to explain the principles of the invention. In the drawings, FIG. 1 is a block diagram of an image processor according to the present invention;

FIG. 2 is a flowchart of the operation of the image processor shown in FIG. 1;

FIG. 3 is a block diagram of a first embodiment of the invention;

FIG. 4 is a flowchart showing the operation of the first embodiment of the invention;

FIGS. 6(a) through 6(f) show how label values of arrayed pixels change in the first embodiment of the invention;

FIG. 8 is a block diagram of a second embodiment of the invention;

FIG. 9 is a flowchart of the operation of the second embodiment of the invention;

FIGS. 11a–c are a diagram showing how label values are altered in the second embodiment.

DESCRIPTION OF THE PREFERRED EMBODIMENTS

Figure 5A:
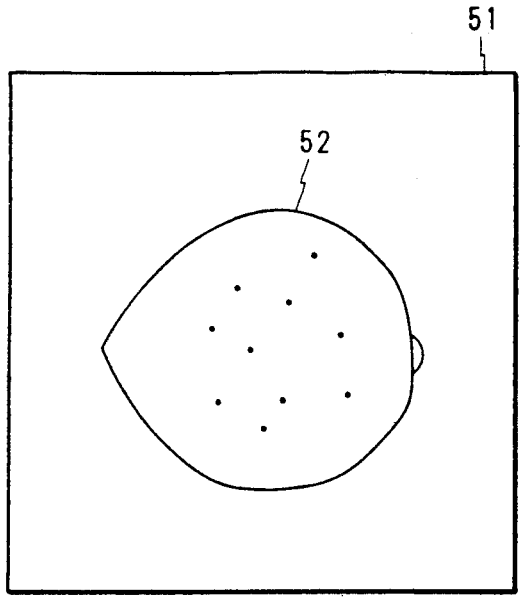
FIGS. 5(a) through 5(c) show displayed images for explaining the operation of the first and second embodiments of the invention.

An image apparatus according to the invention is shown in FIG. 1. A label applying means 13 applies labels to an area containing at least the boundary of an object image. A marked pixel select means 14 selects a pixel from the designated area containing the boundary of the object. Label-value altering means 15 alters or updates the label value of the marked pixel on the basis of the label value and a feature of the selected, marked pixel, and the label values and features of a group of pixels in the vicinity of the marked pixel. Terminate decision means 16 terminates the altering of the label values based upon whether a preset condition holds. A pixel detect means 17 detects a pixel, which has a label value satisfying a specific condition and which is contained in the labeled image, as a pixel present on, inside or outside the boundary of the object.

FIG. 2 is a flow chart of the operation of the present invention. An image composed of pixels is stored in the memory unit 12. The pixels are originally stored as their actual values. Each step of the flow chart is described below.

Figures 6E, 6F:
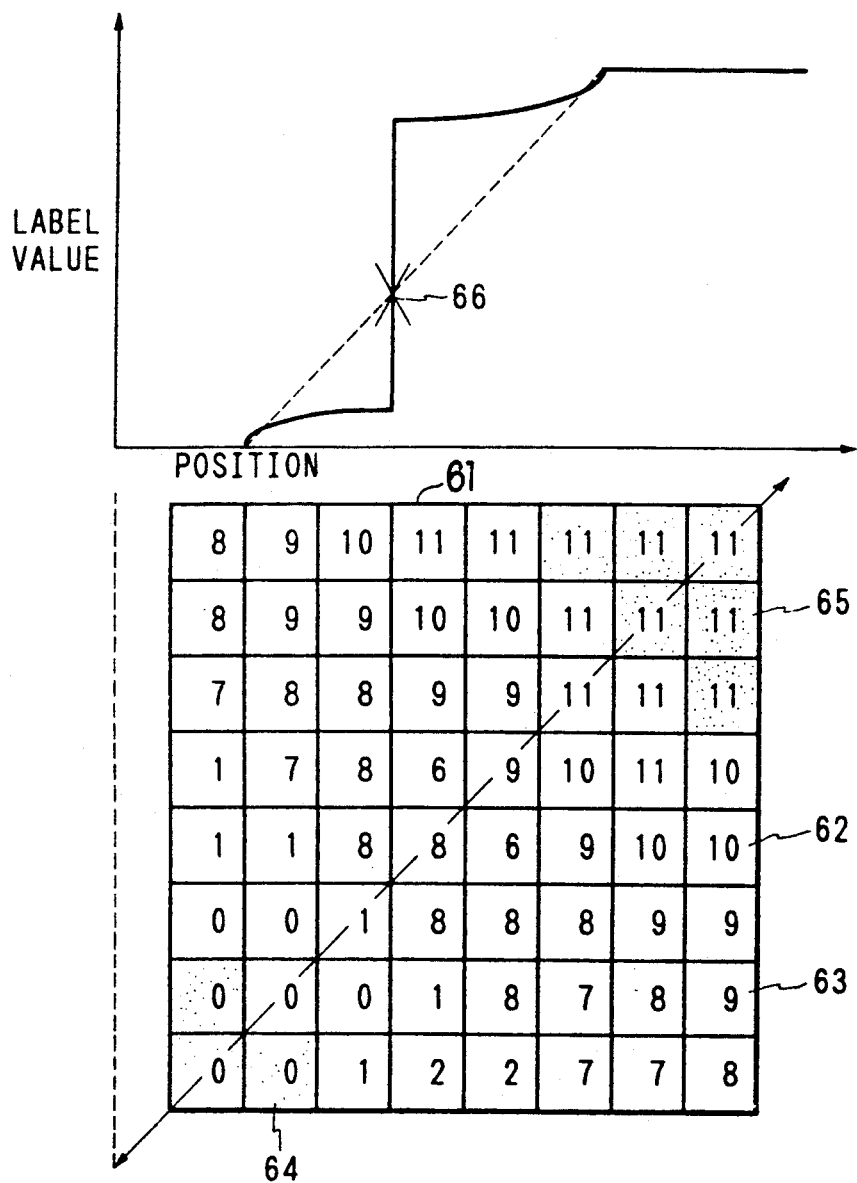

In step 1, each pixel is assigned a label value by the label applying means 13. For pixels in the designated area, the label values are assigned to the pixels without restriction. The label values of pixels outside the designated area must be different from the label values inside the designated area. Minimizing the difference of the label values of those pixels outside the designated area and the difference of the label values of those pixels inside the designated area satisfies the labeling conditions. For example, the pixels may be assigned label values as shown in FIG. 6(a).

Figures 10A, 10B:
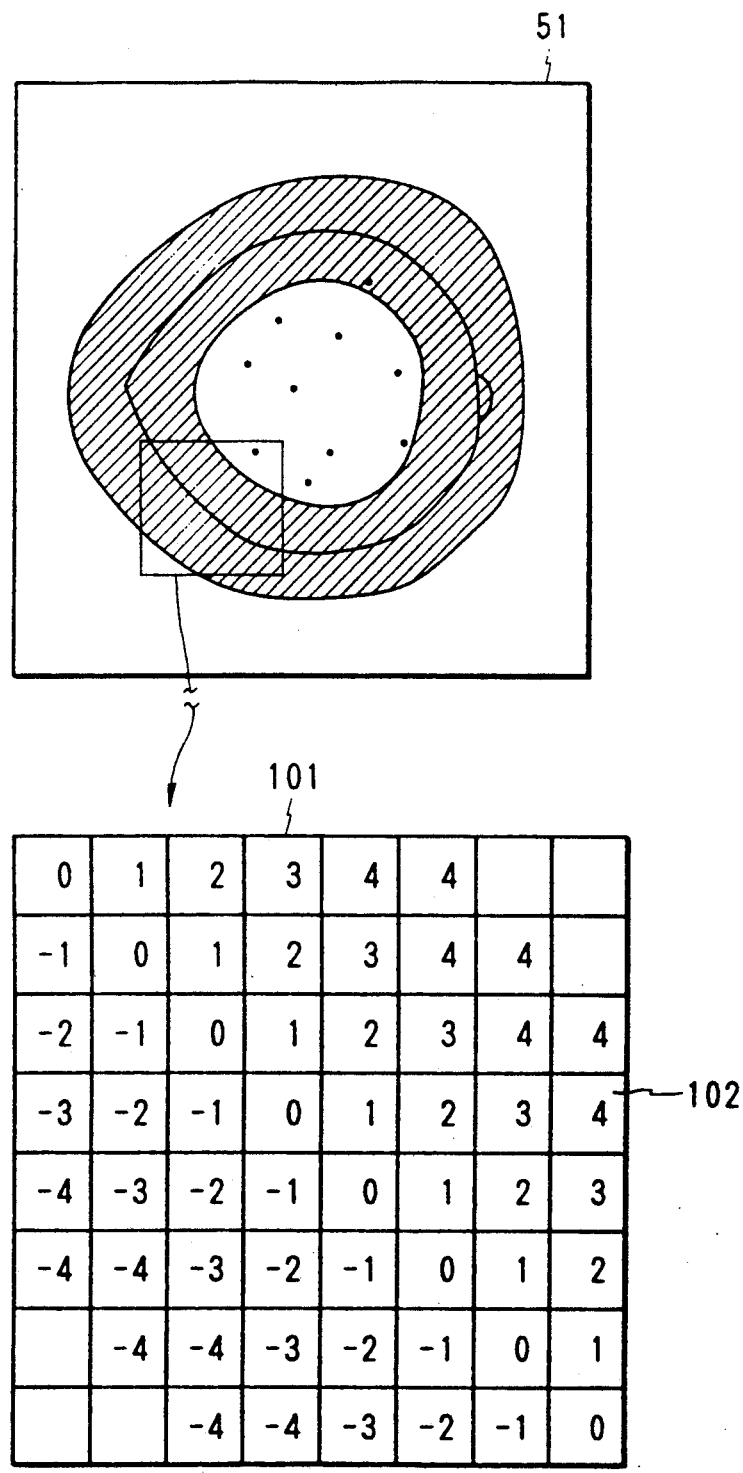
FIGS. 10(a) through 10(f) show displayed images for explaining the operations of the first and second embodiments of the invention.

The label values may only be applied to a designated area. In this example, the only labeling restriction is that the label values of the pixels inside the designated area must be different from the label values of the pixels outside the designated area. The label values and labeling steps may be selected appropriately. For example, label values may be arranged to monotonously increment from the inside of the designated area to the outside, as shown in FIG. 10(a).

In step 2 of FIG. 2, the pixels to be processed in step 3 are selected from the designated area by the marked pixel select means 14. The selected pixels are referred to as "marked pixels".

In step 3 of FIG. 2, the label values of the marked pixels are altered, by the label value altering means 15. The altered values are selected on the basis of the features or actual values of the marked pixels selected in step 2, label values, and the features or actual values of the pixels in the vicinity of the marked pixels. The label values of the marked pixels are altered so that the label values of the marked pixels approximate the label values of the pixels which are located in the vicinity of the marked pixels and have features resembling the marked pixels.

In step 4 of FIG. 2, the terminate decision means 16 decides whether a present condition is satisfied. If the condition is not satisfied, step 2 is repeated.

In step 5 of FIG. 2, the pixel detect means 17 detects the pixels from among the labeled pixels satisfying a specific condition. The detected pixels will outline the boundary of the object or form a mask.

As shown in FIG. 1, a control unit 11 controls the overall system of the image processor, and a memory unit 12 stores images and label values.

FIG. 3 is a block diagram showing an image-cutting processor which is a first embodiment of the present invention. In the image-cutting processor, the pixels inside and outside a designated area are both labeled. In the image cutting processor, a control unit 11 controls the overall system. A memory unit 12 stores images and label values. A mask forming unit 31 forms a mask to cut a part of an image. A display unit 32 displays an object image, and an input unit 33 allows an operator to enter instructions to the image-cutting processor.

The mask forming unit 31 contains the label applying means 13, marked pixel select means 14, label value altering means 15, termination decision means 16, and pixel detect means 17. Each element of the mask forming unit 31 was described with reference to FIG. 1.

The operation of the first embodiment of the invention will be described with reference to the flowchart shown in FIG. 4. The flowchart illustrates steps 1-8 performed by the first embodiment image-cutting processor.

In step 1 of FIG. 4, an object image 51 is displayed on the display unit 32. The image 51 displayed is shown in FIG. 5(a). In this example, an object to be cut 52 is a lemon.

Figure 5B:
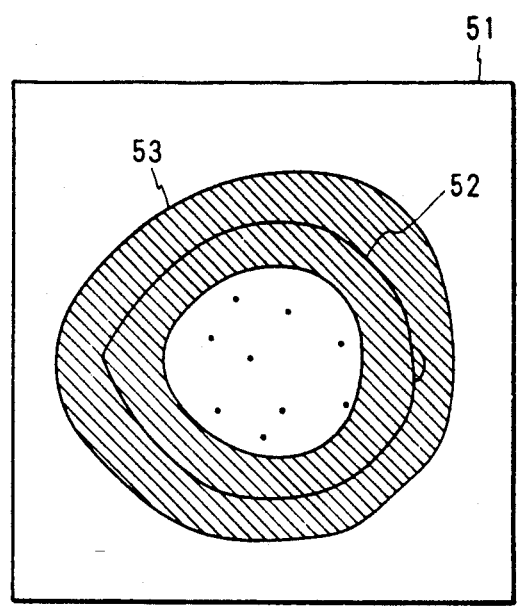

In step 2 of FIG. 4, an area 53 is designated by enclosing the object 52 with a closed loop containing a boundary. The input unit 33 may be used to make the designation. The image displayed in step 2 is shown in FIG. 5(b).

In step 3 of FIG. 4, the respective pixels within the designated area 53 are labeled by the label applying means 53. In this example, the pixels inside the designated area 53 are labeled with values different from the label values of the pixels outside the area. The labeling of the pixels, in this example, is shown in FIG. 6(a).

In step 4 of FIG. 4, the marked pixel select means 14 randomly selects marked pixels from within the designated area.

In step 5 of FIG. 4, the label values of the marked pixels, selected in step 4, are altered by the label altering means 15.

An example of a method to obtain altered label values will now be described.

A number of pixels "k" are selected from those pixels in the area around the marked pixels. The selected pixels are used as reference pixels. The control unit 11 looks for the reference pixel closest to the marked pixel in an n-dimensional feature space consisting of actual pixel values. The control unit 11 then averages the label values of the closest reference pixel and the marked pixel, and uses the average value as the altered label value. The weighted mean may be used for the averaging. In this example, the weight of the marked pixel may be set at 0.

Figures 7A, 7B, 7C:
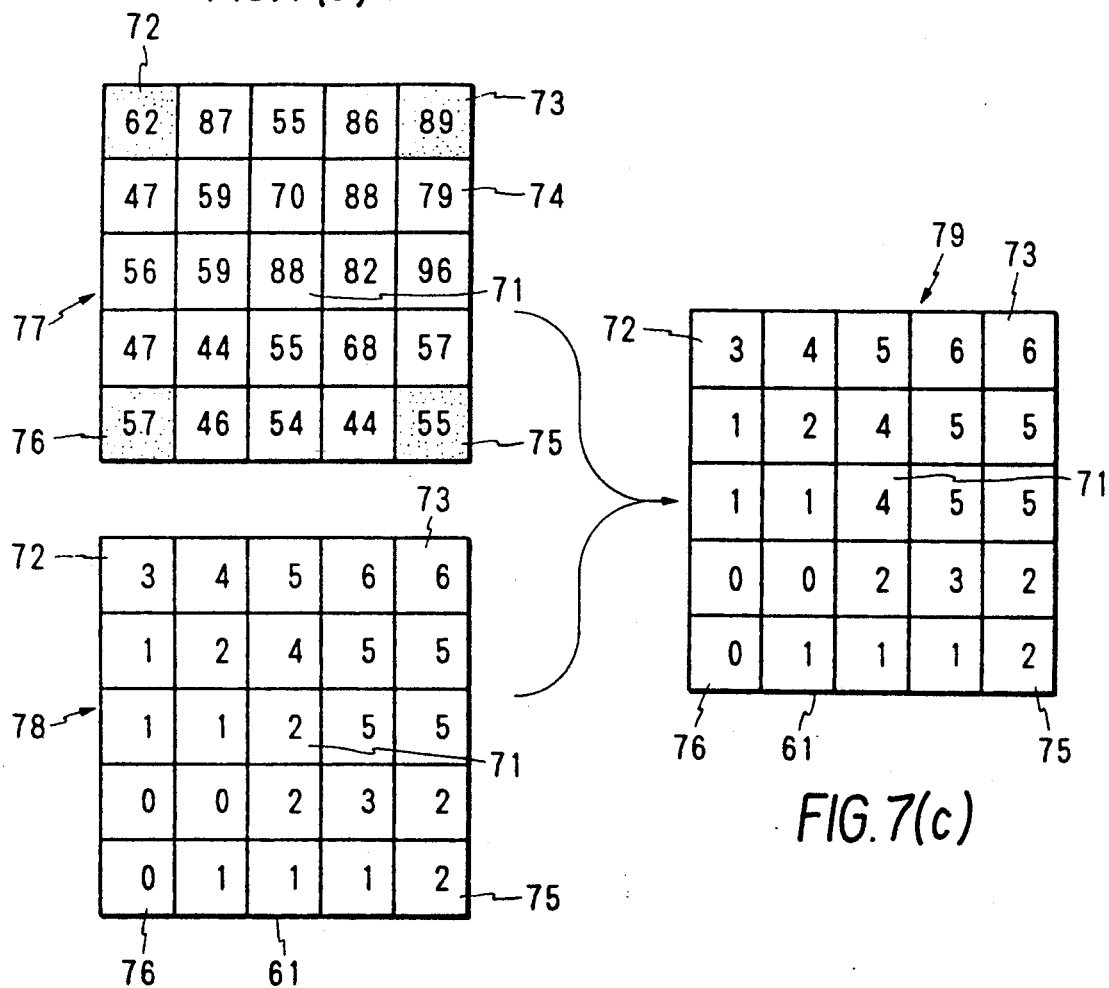
FIGS. 7a–c are a diagram of how label values are altered in the first embodiment of the invention.

FIG. 7 is a diagram of the above method for altering label values. In FIG. 7, chart 77 shows the feature space consisting of actual pixel values; chart 78 shows the label pixel values; and chart 79 shows the altered label pixel values. In this example, four reference pixels 72, 73, 75 and 76 are located at the four corners of a 5×5 area pixels. The marked pixel 71 is located at the center of the area of pixels, and the number of reference pixels k=4. This example uses a one dimensional feature space so n=1. Where n=1, distance in the feature space can be defined by the difference between the pixel values. In FIG. 7, the reference pixel 73, is the reference pixel with an actual value closest to the actual value of the marked pixel 71. The label value of the reference pixel 73 is 6, and the label value of the marked pixel 71 is 2. Therefore, according to the method described above, the altered label value of the marked pixel is: (6+2)/2=4.

The altering process described above minimizes the differences between the label values of the pixels whose features are similar to each other. However, the altering method mentioned above is only one of the possible altering methods As will be described in a second method with reference to FIG. 11, the pixel closest to the marked pixel may be selected from among the pixels in the vicinity of the marked pixel, and the label value of the selected pixel is used as the altered label value of the marked pixel.

In a third method for assigning altered values, a plurality of pixels are selected in the order of distance from the marked pixel.

The number "n", representative of the amount of information contained within a single pixel feature, is limitless. The system adaptability for images containing texture, color variation and the like can be improved by using feature quantities such as the dispersion, differentiated value, and direction of inclination of pixel values, in addition to color coordinate values.

In step 6 of FIG. 4, the terminate decision means 16 decides whether to terminate or repeat steps 4 and 5. To decide whether to terminate, an interim state of the processing may be displayed so that an operator can direct the termination on the basis of the display. In the alternative if the label altering is performed "n" times for the respective pixels within a designated area, the processing is automatically stopped.

In step 7 of FIG. 4, a mask of the object is formed by the pixel detect means 17.

FIG. 6(a) shows the original label values of the pixels, while FIGS. 6(b) and 6(c) show altered pixel label values. Through the processing up to step 6, the labeled image changes its state from the state shown in FIG. 6(b) to the state shown in FIG. 6(c). The pixels 65 are inside the designated area, while the pixels 64 are outside the designated area. The pixels 63 are within the designated area. The pixel 62 within the designated area has a label value of 9. The top portion of FIG. 6(a) shows the image to be analyzed 51, while the top portions of FIGS. 6(c) and 6(b) show graphs of pixel values versus position. Point 66 on the graph shown in the top portions of FIGS. 6(b) and 6(c) is in the position where the boundary is present. As shown in the graphs in the top portions of FIGS. 6(b) and 6(c), there is a sharp differentiation between the label values on either side of the position where the boundary is present.

In the altered state shown in FIG. 6(c), the labeled image can be binarized with a threshold value indicated by an operator, and the area inside or outside the boundary can be recognized using the binarized values. As a consequence, a mask image of the object can be formed.

In step 8 of FIG. 4, the desired object is cut by multiplying the mask and the original image.

As seen from the foregoing description, the first embodiment of the invention can rapidly detect the boundary of an object in an ordinary image containing color variation and texture. The first embodiment of the invention can also rapidly distinguish the areas inside and outside of the boundary. Therefore, a mask image is easily formed, and image processing, such as cutting and modifying, is easily done.

In the first embodiment, information of pixels outside the designated area is also used for altering the label values. With this feature, the first embodiment forms a mask more accurately and quicker than the second embodiment.

FIG. 8 is a block diagram showing a second embodiment of the present invention. In the second embodiment, labels are only applied to the pixels within a designated area of the image.

A control unit 11 controls the overall system. A memory unit 12 stores images, label values, and the like. A boundary detect unit 81 detects the boundary of a specified part of the image. A display unit 82 displays the object image. An input unit 83 allows an operator to enter instructions to the apparatus, and a mask forming unit 84 forms a mask used to cut a partial image from an image. The boundary detect unit 81 contains the label applying means 13, marked pixel select means 14, label value altering means 15, termination decision means 16, and pixel detect means 17. The elements of the boundary detect unit were described with reference to FIG. 1.

The operation of the second embodiment of the invention will be described referring to the flowchart shown in FIG. 9.

In step 1 of FIG. 9, an object image 51 is displayed on the display unit 82. The image 51 displayed in step 1 is shown in FIG. 5(a). The object displayed 52 is a lemon.

In step 2 of FIG. 9, an area 53 is designated by enclosing the object 52 by a closed loop containing a boundary. The input unit 83 may be used to make the designation. The image displayed in step 2 is shown in FIG. 5(b).

In step 3 of FIG. 9, the respective pixels within the designated area 53 are labeled by the label applying means 13. In this example, the label values of the pixels inside the designated area 53 are selected to be different from the label values of the pixels outside the designated area. In this example, the label values of the pixels become larger toward the inner side of the designated area. Preferably, a fixed label value is successively assigned to the pixels located on the outer edge of the designated area 53 along the closed loop. A second fixed label value is then assigned to each pixel located on the line innerly located next to the outer edge line, along the closed loop. In this way, fixed label values are assigned to all the pixels within the designated area 53.

In step 4 of FIG. 9, the marked pixel select means 14 selects marked pixels from pixels within the designated area using random numbers. In this example, the pixels on the outer edge line of the designated area 53 and those on the inner edge (the pixels adjacent other areas than the designated area) are not selected.

In step 5 of FIG. 9, the label values of the marked pixels which were selected in step 4 are altered by the label altering means 15. The label altering method is similar to that in the first embodiment. An example of the label altering method will be described below.

An n-dimensional feature space consists of actual pixel values of the pixels. The control unit 11 looks among the $k \times l$ reference pixels, located in the vicinity of the marked pixel in the designated area, for the pixel with an actual value closest to the actual value of the marked pixel. The label value of the selected pixel is used as the altered label value of the marked pixel.

FIG. 11 is an explanatory diagram of the method to select altered label values stated above. In FIG. 11, chart 114 shows an $n=1$ feature space consisting of actual pixel values; chart 115 shows the label pixel values; and chart 116 shows the altered label pixel values. In this example, $k \times l = 3$ and $n=1$. When $n=1$, the distance in the feature space can be defined as the difference between the pixel values. In FIG. 11, of the $3 \times 3$ pixels neighboring the marked pixel 111, the pixel with an actual value closest to the actual value of the marked pixel is pixel 112. The label value of pixel 112 is 4, and, hence, the altered value of the marked pixel is 4.

The number "n", representative of the amount of information contained within a single pixel feature used in step 4, is limitless. The system adaptability for images containing texture, color variation and the like can be improved by using feature quantities such as dispersion, differentiated value, and direction of inclination of pixel values, in addition to color coordinate values.

In the example above, "k" and "l" are fixed for ease of explanation, but those values are not always fixed during processing. The label values may be altered faster by changing the area neighboring the marked pixel by, for example, changing "k" and "l" by using random numbers, or increasing "k" and "l" until a certain condition is satisfied.

Alternatively, the processing speed may be increased by reducing the number of calculations by appropriately thinning out the pixels within the $k \times l$ area. That is, all of the pixels within the designated area are not used for the processing.

In step 6 of FIG. 9, the terminate decision means 16 decides whether to terminate the processing or repeat steps 4 and 5. As in the first embodiment, to decide whether to terminate, an interim state of the processing may be displayed so that an operator can direct the termination on the basis of the display. In the alternative, if the label altering is performed "n" times for the respective pixels within a designated area, the processing is automatically stopped.

In step 7 of FIG. 9, a mask of the object is formed by the pixel detect means 17.

Figure 10C:
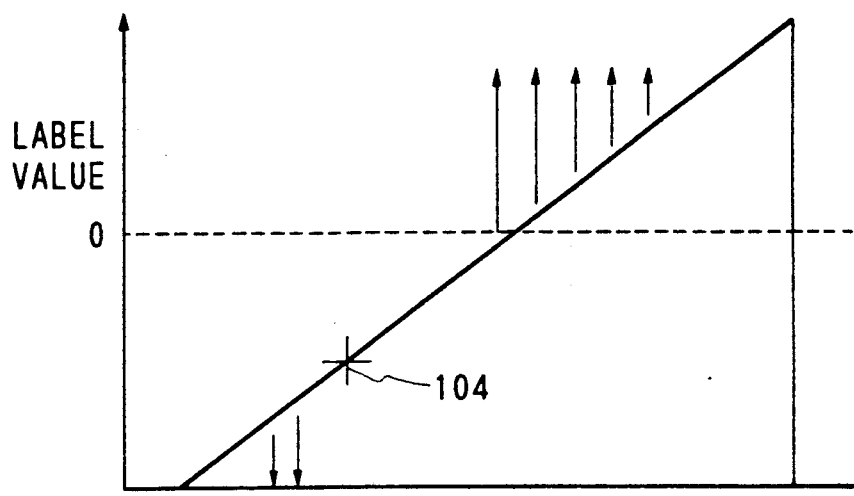
Figure 10D:
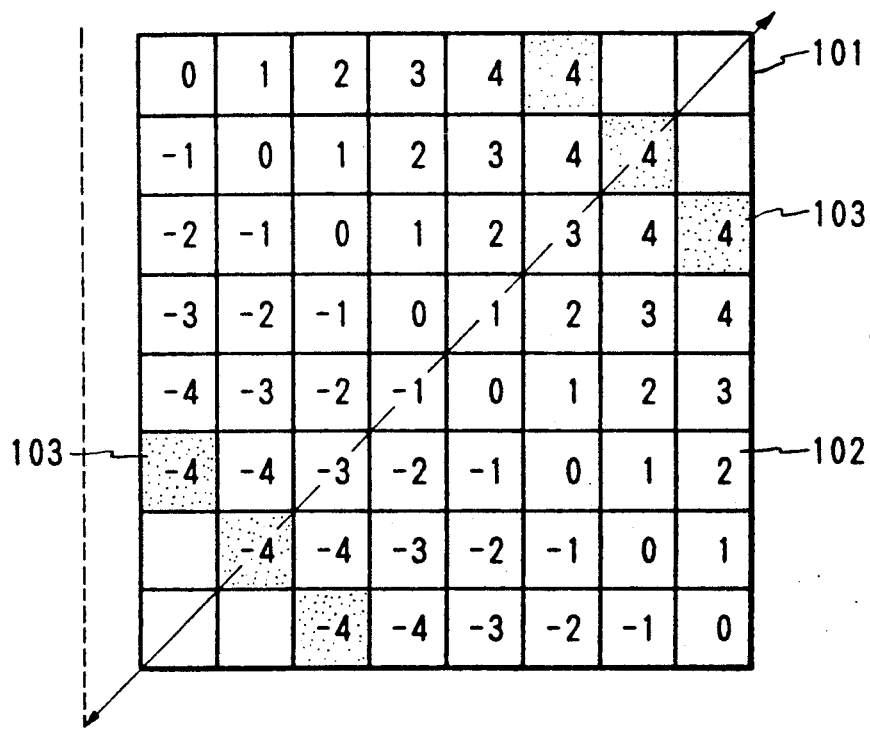
Figure 10E:
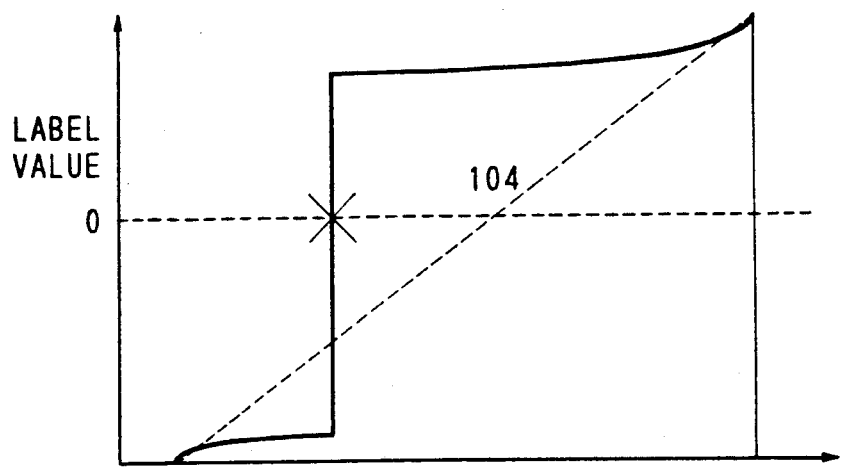
Figure 10F:
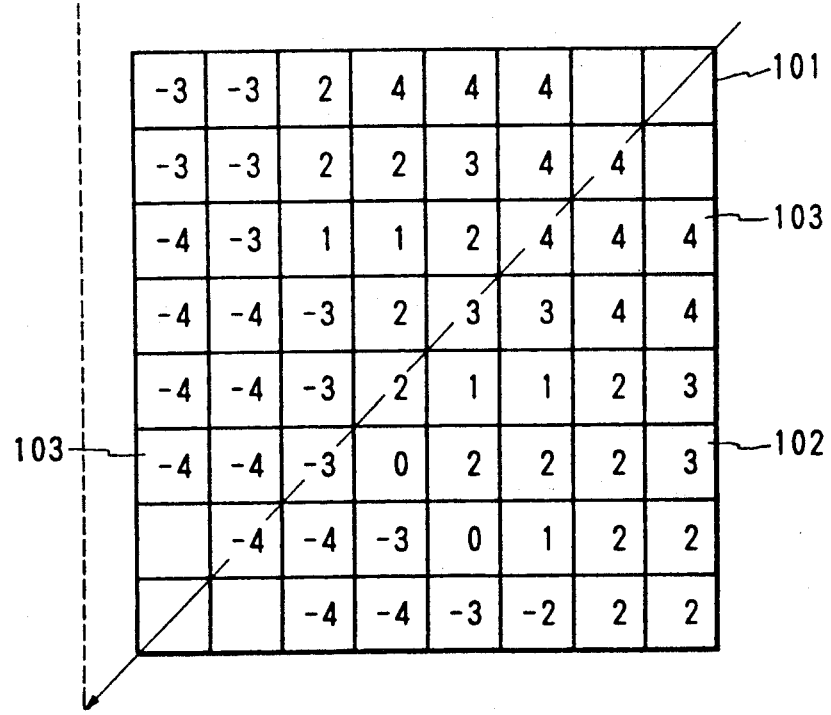

The original label values are shown in FIG. 10(a), while FIGS. 10(b) and 10(c) show altered pixel label values. Through the processing up to step 6, the labeled image changes its state from the state of FIG. 10(b) to that of FIG. 10(c). The pixels 103 are not within the designated area, while the pixels 102 are within the designated area. The top portion of FIG. 10(a) shows the image to be analyzed 51, while the top portions of FIGS. 10(c) and 10(b) show graphs of pixel values versus position. Point 104 on the graph shown in the top portions of FIGS. 10(b) and 10(c) is in the position where the boundary is present. As shown in the graphs in the top portions of FIGS. 10(b) and 10(c), there is a sharp differentiation between the label values on either side of the position where the boundary is present.

As seen from FIGS. 10(a)–10(c), the position 104 where the boundary of the object exists may be detected by detecting a cross point of a threshold value indicated by an operator and a label value. The position 104 may also be detected by tracing a label value variation curve and finding a portion of the curve where the label value sharply or abruptly changes.

In step 8 of FIG. 9, an operator using the input unit 83 instructs the apparatus to cut the image inside or outside the boundary.

Figure 5C:
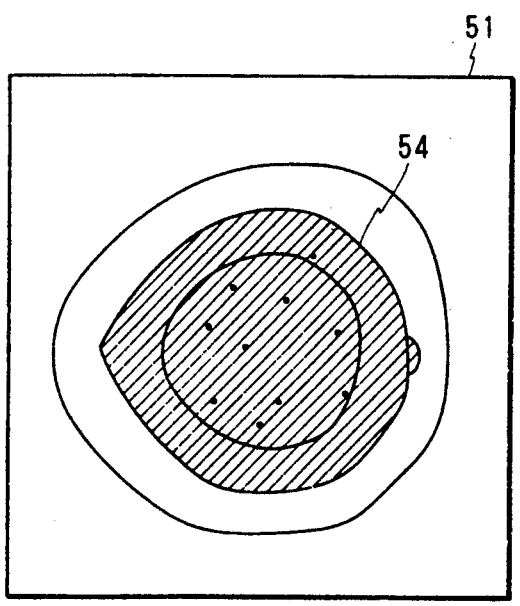

In step 9 of FIG. 9, according to the instruction in step 8, the mask forming unit 84 forms a cut mask 54 as the painted-out area inside or outside the boundary. The result of the processing in this step is illustrated in FIG. 5(c).

In step 10 of FIG. 9, the desired object is cut by multiplying the mask and the original image.

As seen from the foregoing description, the second embodiment of the present invention can rapidly detect the boundary of an object in an ordinary image containing color variation and texture by a simple operation. Accordingly, various image processing steps, such as cutting and modifying can easily be done by forming a contour line and a mask image from the boundary of the detected object.

In the first and second embodiments, all of the processing steps are executed for every pixel. Alternatively, the processing steps may only be executed every unit area or for a small area consisting of pixels having similar features. Processing based upon groups of pixels further increases the processing speed. An example of the first alternative method will now be described.

Figure 12A:
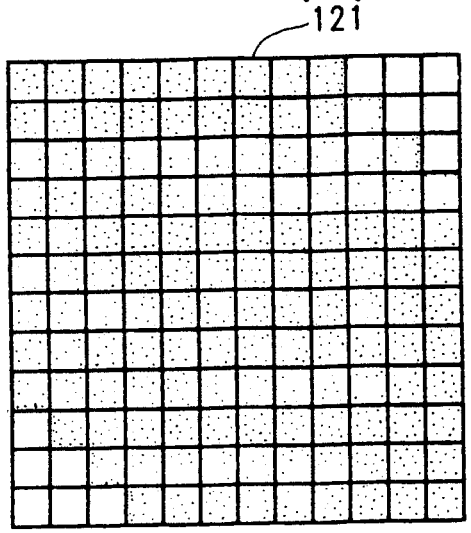
FIGS. 12(a) through 12(e) are diagrams showing designated areas in a modification of the invention.
Figure 12B:
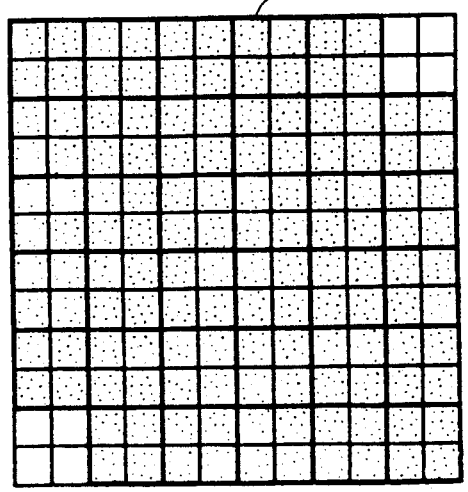
Figure 12C:
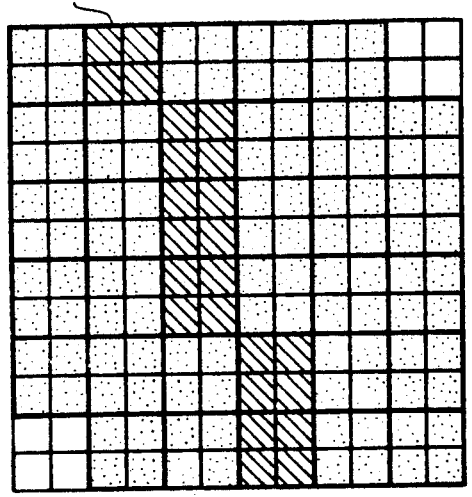
Figure 12D:
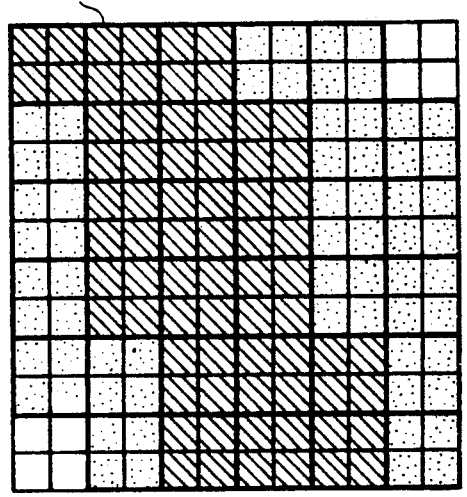
Figure 12E:
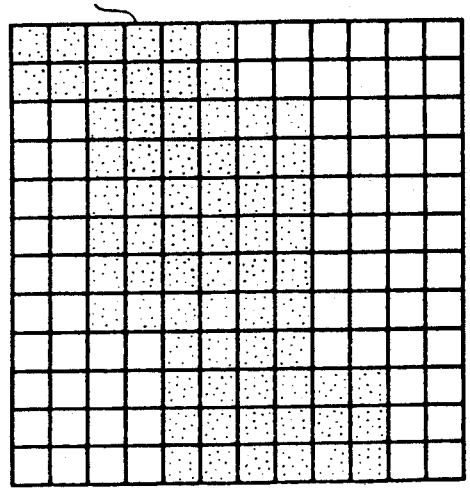

As shown in FIGS. 12(a) and 12(c), an area of p×q pixels 121 (p=q=2) constitutes a unit area 122. In a first processing step, the unit area 122 is treated as a single pixel. The actual value of the unit area 122 is a mean of the actual values of the pixels within the unit area 122. As a result the first processing step, an altered unit area 123 containing a boundary as shown in FIG. 12(c) is gained. Unit area 123 is slightly expanded into a new designated area 124, as shown in FIGS. 12(d) and 12(e). In a second processing step, the new designated area 124 is processed on an every-pixel basis.

In the first alternative method, two processing steps are required, so that the number of processing steps is increased. However, the number of pixels processed in each step is also increased. Therefore, the overall processing speed of the apparatus is increased.

In a second alternative method, a first pixel and those pixels adjacent the first pixel whose values are equal to the first pixel are gathered into a unit area. The processing is then performed every unit area, and the boundary can be obtained without every-pixel processing.

As seen from the foregoing description, the image processor can designate an object image in an ordinary image containing light reflection, texture, noise and the like, and can detect the boundary of the object image and form a mask image rapidly and simply.

When the label values are altered by using the information of pixels outside the designated area, the mask of the ordinary image containing color variation, texture and the like can be formed rapidly and accurately.

The foregoing description of preferred embodiments of the invention has been presented for purposes of illustration and description. It is not intended to be exhaustive or to limit the invention to the precise form disclosed, and obviously many modifications and variations are possible in light of the above teachings or may be acquired from practice of the invention. The embodiments were chosen and described in order to best explain the principle of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A method for processing an image composed of pixels having actual values, the image picturing an object having a boundary, the method comprising the steps of:

designating a group of pixels, the designated group of pixels including the pixels which form the image of the object;

labeling the pixels in the designated group of pixels with label values;

marking one of the pixels in the designated group; and altering the label value of the marked pixel, the altered label value being dependent upon the actual value and the label value of the marked pixel and the actual value and the label value of at least one other pixel;

wherein the step of altering the label value of the marked pixel comprises the sub-steps of:

selecting more than one pixel other than the marked pixel as reference pixels;

comparing the actual values of the reference pixels with the actual value of the marked pixel;

selecting the reference pixel with an actual value closest to the actual value of the marked pixel as a closest reference pixel;

averaging the label value of the marked pixel with the label value of the closest reference pixel to obtain an average value; and changing the label value of the marked pixel to the average value.

2. A method for processing an image as claimed in claim 1, wherein pixels not in the designated group of pixels are also labeled and the label values of the pixels not in the designated group of pixels are different from the label values of the pixels in the designated group of pixels.

3. A method for processing an image as claimed in claim 1, wherein the reference pixels are selected from the group of designated pixels.

4. A method for processing an image as claimed in claim 1, wherein the reference pixels are selected from the group of designated pixels.

5. A method for processing an image as claimed in claim 3, wherein more than one pixel is marked in the step for marking pixels, the marked pixels forming a unit area, and the unit area having an actual value equal to the average of the actual values of the marked pixels.

6. A method for processing an image as claimed in claim 5, wherein the marked pixels all have equal actual values.

7. A method for processing an image composed of pixels having actual values, the image picturing an object having a boundary, the method comprising the steps of:
designating a group of pixels, the designated group of pixels including the pixels which form the image of the object;
labeling the pixels in the designated group of pixels with label values;
marking one of the pixels in the designated group; and
altering the label value of the marked pixel, the altered label value being dependent upon the actual value and the label value of the marked pixel and the actual value and the label value of at least one other pixel;
detecting the boundary of the object pictured in the image using the altered label values;
wherein the step of altering the label value of the marked pixel comprises the sub-steps of:
selecting more than one pixel other than the marked pixel as reference pixels;
comparing the actual values of the reference pixels with the actual value of the marked pixel;
selecting the reference pixel with an actual value closest to the actual value of the marked pixel as a closest reference pixel;
averaging the label value of the marked pixel with the label value of the closest reference pixel to obtain an average value; and
changing the label value of the marked pixel to the average value.

8. A method for processing an image as claimed in claim 7, wherein only the designated group of pixels is labeled.

9. A method for processing an image as claimed in claim 7, further comprising the steps of:
forming a mask of the area inside the boundary of the object; and
multiplying the mask and the image to cut the object image.

10. A method for processing an image composed of pixels having actual values, the image picturing an object having a boundary, the method comprising the steps of:
designating a group of pixels, the designated group of pixels including the pixels which form the image of the object;
labeling the pixels in the designated group of pixels with label values;
marking one of the pixels in the designated group; and
altering the label value of the marked pixel, the altered label value being dependent upon the actual value and the label value of the marked pixel and the actual value and the label value of at least one other pixel;
detecting the boundary of the object pictured in the image using the altered label values;
forming a mask of the are inside the boundary of the object; and
multiplying the mask and the image to cut the object image;
wherein the step of altering the label value of the marked pixel comprises the sub-steps of:
selecting more than one pixel other than the marked pixel as reference pixels;
comparing the actual values of the reference pixels with the actual value of the marked pixel;
selecting the reference pixel with an actual value closest to the actual value of the marked pixel as a closest reference pixel;
changing the label value of the marked pixel to the label value of the selected reference pixel.

11. A method for processing an image as claimed in claim 10, wherein only the designated group of pixels is labeled.

12. A method for processing an image composed of pixels having actual values, the image picturing an object having a boundary, the method comprising the steps of:
designating a group of pixels, the designated group of pixels including the pixels which form the image of the object;
labeling the pixels in the designated group of pixels with label values;
marking one of the pixels in the designated group; and
altering the label value of the marked pixel, the altered label value being dependent upon the actual value and the label value of the marked pixel and the actual value and the label value of at least one other pixel;
detecting the boundary of the object pictured in the image using the altered label values;
forming a mask of the are inside the boundary of the object; and
multiplying the mask and the image to cut the object image;
wherein the step of altering the label value of the marked pixel comprises the sub-steps of:
selecting more than one pixel other than the marked pixel as reference pixels;
comparing the actual values of the reference pixels with the actual value of the marked pixel;
selecting the reference pixel with an actual value closest to the actual value of the marked pixel as a closest reference pixel;
averaging the label value of the marked pixel with the label value of the closest reference pixel to obtain an average value; and
changing the label value of the marked pixel to the average value.

13. A method for processing an image as claimed in claim 12, wherein only the designated group of pixels is labeled.

14. A method for processing an image composed of pixels having actual values, the image picturing an object having a boundary, the method comprising the steps of:

designating a group of pixels, the designated group of pixels including the pixels which form the image of the object;

labeling the pixels in the designated group of pixels with label values;

marking one of the pixels in the designated group; and altering the label value of the marked pixel, the altered label value being dependent upon the actual value and the label value of the marked pixel and the actual value and the label value of at least one other pixel;

detecting the boundary of the object pictured in the image using the altered label values;

forming a mask of the are inside the boundary of the object; and multiplying the mask and the image to cut the object image;

wherein the step of altering the label value of the marked pixel comprises the sub-steps of:

selecting more than one pixel other than the marked pixel as reference pixels;

comparing the actual values of the reference pixels with the actual value of the marked pixel;

selecting the reference pixel with an actual value closest to the actual value of the marked pixel as a closest reference pixel;

changing the label value of the marked pixel to the label value of the selected reference pixel.

15. A method for processing an image as claimed in claim 14, wherein only the designated group of pixels is labeled.

16. An image processor for an image composed of pixels having actual values, the image picturing an object having a boundary, the processor comprising:

designating means for designating a group of pixels, the designated group of pixels including the pixels which form the image of the object;

labeling means for labeling the pixels designated by the designating means with label values;

marking means for marking one of the pixels designated by the designating means; and altering means for altering the label value of the pixel marked by the marking means, the altered label value being dependent upon the actual value and the label value of the marked pixel and the actual value and the label value of at least one other pixel;

wherein the altering means comprises:

first selecting means for selecting more than one pixel other than the pixel marked by the marking means as reference pixels;

comparing means for comparing the actual values of the reference pixels with the actual value of the pixel marked by the marking means;

second selecting means for selecting the reference pixel with an actual value closest to the actual value of the pixel marked by the marking means as a closest reference pixel;

averaging means for averaging the label value of the pixel marked by the marking means with the label value of the closest reference pixel to obtain an average value; and changing means for changing the label value of the pixel marked by the marking means to the average value.

17. An image processor as claimed in claim 16, wherein pixels not in the designated group of pixels are also labeled and the label values of the pixels not in the designated group of pixels are different from the label values of the pixels in the designated group of pixels.

18. An image processor as claimed in claim 16, wherein the reference pixels are selected from the group of designated pixels.

* * * * *

UNITED STATES PATENT AND TRADEMARK OFFICE
CERTIFICATE OF CORRECTION

PATENT NO.   :   5,181,261
DATED        :   January 19, 1993
INVENTOR(S)  :   Takashi Nagao Page 1 of 2

It is certified that error appears in the above-identified patent and that said Letters Patent is hereby corrected as shown below:

Claim 7, column 9, line 25, delete "and".

Claim 7, column 9, line 30, after "pixel;" insert --and--.

Claim 10, column 9, line 66, delete "and".

Claim 10, column 10, line 6, change "are" to --area--.

Claim 10, column 10, line 19, change "closest" to --selected--.

Claim 12, column 10, line 35, delete "and".

Claim 12, column 10, line 43, change "are" to --area--.

Claim 14, column 11, line 7, delete "and".

Claim 14, column 11, line 16, change "are" to --area--.

UNITED STATES PATENT AND TRADEMARK OFFICE
CERTIFICATE OF CORRECTION

PATENT NO. : 5,181,261
DATED : January 19, 1993
INVENTOR(S) : Takashi Nagao

It is certified that error appears in the above-indentified patent and that said Letters Patent is hereby corrected as shown below:

Claim 14, Column 11, line 30, change "closest" to --selected--.

Signed and Sealed this

Fourteenth Day of December, 1993

Attest:

BRUCE LEHMAN

Attesting Officer

Commissioner of Patents and Trademarks